Patented June 13, 1939

2,162,397

UNITED STATES PATENT OFFICE 2,162,397

ELECTROLYTE AND METHOD

Donald E. Gray, Teaneck, N. J.

No Drawing. Original application July 6, 1934, Serial No. 733,976. Divided and this application March 4, 1939, Serial No. 259,850

25 Claims. (Cl. 175—315)

My invention relates to electrolytic condensers and more particularly to electrolytic capacitors comprising one or more metallic foils or plates coated with oxide or dielectric film spaced from a second foil or plate by an electrolyte held by a carrier, such as a porous or other separator impregnated with an electrolyte solution.

This is a division of my co-pending application Serial No. 733,976, filed July 6, 1934.

The general object of my invention consists in the provision of a novel method for making electrolytic condensers which is simple and easy to carry out and does not require highly trained and technical experience, as in the case of hitherto known methods in the art of manufacturing electrolytic condensers.

A related object of my invention is to provide a novel method for more rapidly and economically preparing an electrolyte for electrolytic capacitors whereby no external heat need be applied, enabling a cold impregnating electrolyte for electrolytic condensers to be employed.

These and other objects and advantages of my invention will be apparent from the more detailed description and explanation thereof which follows. It is to be understood that the description is to be regarded as illustrative only of the general principle of the invention which is subject to various modifications and embodiments as will become obvious.

According to previously known methods, in order to form a compound for impregnating an electrolytic condenser, it was customary to mix a suitable constituent, such as ammonium borate, with a glycerine or glycol and boil the solution at certain critical temperatures in order to eliminate a certain amount of water, which method is very objectionable and costly and has to be carefully watched as too much of the ammonia gas may be liberated by excess heating, thus making it difficult to ascertain the exact and proper composition when the boiling is completed.

The novel method of preparing the electrolyte according to my invention consists in mixing (1) an anhydride or oxide of a weak acid, the anhydride being an oxide which combines with water to produce an acid, as is well known; (2) an alkali metal hydroxide or ammonium hydroxide or an alkali metal oxide or ammonia, respectively; and (3) a polyhydroxyl alcohol. The anhydride or oxide of a weak acid of group 1 may be boric oxide ($B_2O_3$). I have found that for group 2 the following oxides or hydroxides, respectively, give good results: sodium hydroxide or sodium oxide; ammonium hydroxide or ammonia; potassium hydroxide or potassium oxide; calcium hydroxide or calcium oxide; strontium hydroxide or strontium oxide; lithium hydroxide or lithium oxide. For the polyhydroxyl alcohol of group 3 glycerin or ethylene glycol may be used.

As an example, a simple method which I have found to give satisfactory and good results consists in mixing polyhydroxyl alcohol, such as ethylene glycol or glycerin (group 3) with ammonia or an alkali oxide (group 2), thus making an alkaline glycerin or alkaline glycol solution, both of which give satisfactory results. Then to this mixture is added the desired quantity of the weak acid oxide, such as boric oxide (group 1), as mentioned above. The whole is thoroughly stirred to produce a certain desired, sticky, gummy and paste-like mass of thick consistency and structure to make the electrolyte. The boric oxide is obtainable in a powdered state, and when mixing with the ammoniated glycerin, or equivalent, as noted above, it is stirred, whereby a slight amount of heat is generated due to the chemical reaction and composition of the compounds. In making this solution, no external heat is necessary to be applied as the solution is ready as soon as the mixing is complete, or, if it is desired to quicken the chemical action, a slight amount of heat can be applied.

While it is preferred to add the alkali of the electrolyte to the polyhydroxyl alcohol, this is not required as good results can be obtained by mixing the oxide of a weak acid (group 1) with the polyhydroxyl alcohol (group 3), and then adding the alkali metal oxide or ammonia gas (group 2); or the alkali metal oxide or ammonia (group 2) may be added to the oxide of a weak acid (group 1), and the polyhydroxyl alcohol (group 3) then mixed.

The electrolyte can also satisfactorily be made by using nitrogenated polyhydroxyl alcohol such as triethanolamine or diethanolamine, in which case it is unnecessary to use the alkali of group 2, for nitrogenated polyhydroxyl alcohol has the alkaline reaction in itself. This electrolyte, therefore, may be made with the nitrogenated polyhydroxyl alcohol and the oxide of a weak acid only.

I have also found it desirable in some cases to add a suitable thinning medium, such as water or a monohydroxyl alcohol to the above solution of electrolyte, or it is also possible to replace a portion of the said weak acid oxide or alkali with the salt of a weak acid or a weak acid itself.

I have found it desirable, but not entirely necessary, in some cases, to add to the thus prepared electrolyte solution, various types of gum, such as gum tragacanth in order to produce certain desired characteristics in the electrolytic capacitor in which the electrolyte is used. The gum should be added to the electrolyte at a temperature not above 70° C. and should be sifted into the electrolyte slowly and mixed thoroughly as each small quantity is added. Instead of gum tragacanth, other fillers can be used such as kaolin, casein, starches or sugars and possibly commercial plastics, as this merely acts as a filler to make the electrolyte thicker without having a deteriorating chemical effect on the electrolyte.

While the electrolytes according to the invention and as described in detail herein are primarily intended for the impregnation of the assembled condenser; that is, to serve as a conducting medium or second condenser electrode, the other electrode being formed by the filmed foil with the dielectric or oxide film thereon acting as the condenser dielectric; it is understood that the electrolyte according to the invention may be used for producing the oxide or dielectric film on the positive condenser electrodes or foils by any treating method known in the art, such as an electrolytic process for producing a filmed electrode which is then assembled with another filmed or non-filmed electrode and impregnated with the operating electrolyte, according to the invention.

Electrolyte according to my invention can be used for both AC and DC capacitors and with any type of spacers, such as of paper, gauze or other fibrous or non-fibrous material which is used for holding the electrolyte in capacitors; or it may be used in some cases without a separator by placing a thin layer of the paste-like electrolyte on the electrodes.

I claim:

1. The method of forming an electrolytic solution for a metallic condenser foil which comprises mixing a polyhydroxyl alcohol with ammonia to make an alkaline alcohol solution, then adding a suitable quantity of weak acid oxide and thoroughly intermixing to produce a sticky paste-like mass of comparatively thick consistency, the solution being applied continuously to the foil without artificial heat.

2. The method of forming an electrolytic solution for a metallic condenser foil which comprises mixing a polyhydroxyl alcohol with an alkali oxide to make an alkaline polyhydroxyl alcohol solution, then adding a suitable quantity of weak acid oxide and thoroughly intermixing to produce a sticky paste-like mass of comparatively thick consistency without evaporating water therefrom.

3. The method of forming an electrolytic solution for a metallic condenser foil which comprises mixing a polyhydroxyl alcohol with an alkali oxide to make an alkaline polyhydroxyl alcohol solution, then adding a suitable quantity of weak acid oxide and thoroughly intermixing to produce a sticky paste-like mass of comparatively thick consistency, the solution being applied continuously to the foil without artificial heat.

4. A coated metallic foil for electrolytic condensers and the like, the coating being of a thick paste-like consistency and applied to the foil, said coating comprising the product of a mixture of an anhydride of a weak acid, an alkali metal oxide and a polyhydroxyl alcohol.

5. An electrolyte solution for electrolytic condensers which comprises the product of a mixture of polyhydroxyl alcohol with an alkaline compound selected from the group of oxides and hydroxides of sodium, potassium, lithium, calcium and strontium, said group also including ammonia and ammonium hydroxide, to produce an alkaline alcohol solution, and a suitable quantity of weak acid anhydride thoroughly intermixed to secure a desired consistency of solution without boiling.

6. An electrolyte solution for electrolytic condensers which comprises the product of a mixture of polyhydroxyl alcohol with an alkaline compound selected from the group of oxides and hydroxides of sodium, potassium, lithium, calcium and strontium, said group also including ammonia and ammonium hydroxide, to produce an alkaline alcohol solution, and a suitable quantity of boric oxide thoroughly intermixed to secure a desired consistency of solution substantially without boiling.

7. An electrolyte for electrolytic condensers consisting of the product of a mixture of a polyhydroxyl alcohol, an alkali metal oxide or ammonia and a weak acid oxide in proportions to give substantially without boiling a consistency suitable for electrolytic condensers.

8. An electrolyte for electrolytic condensers consisting of the product of a mixture of polyhydroxyl alcohol, an alkali metal oxide or ammonia and boric oxide in proportions to give substantially without boiling a consistency suitable for electrolytic condensers.

9. An electrolyte for electrolytic condensers consisting of the product of a mixture of a polyhydroxyl alcohol, a hydroxide of alkali metal or ammonia hydroxide and a weak acid oxide proportioned to give substantially without boiling a consistency suitable for electrolytic condensers.

10. An electrolyte for electrolytic condensers consisting of the product of a mixture of a polyhydroxyl alcohol, a hydroxide of alkali metal or ammonia and boric oxide proportioned to give substantially without boiling a consistency suitable for electrolytic condensers.

11. An electrolyte for electrolytic condensers comprising the product of an intimate mixture of glycerine, ammonia gas and boric oxide.

12. An electrolyte for electrolytic condensers comprising the product of an intimate mixture of ethylene glycol, ammonia gas and boric oxide.

13. An electrolyte for electrolytic condensers comprising the product of an intimate mixture of glycerine, ammonium hydroxide and boric oxide.

14. An electrolyte for electrolytic condensers comprising the product of an intimate mixture of ethylene glycol, ammonium hydroxide and boric oxide.

15. An electrolyte solution for electrolytic condensers which comprises the product of a mixture of nitrogenated polyhydroxyl alcohol and a weak acid oxide thoroughly intermixed to secure the desired thick consistency of the solution substantially without the application of external heat.

16. An electrolyte solution for electrolytic condensers which comprises the product of a mixture of ammoniated polyhydroxyl alcohol and a suitable quantity of weak acid anhydride thoroughly intermixed to secure a desired consistency of solution substantially without boiling.

17. An electrolyte solution for electrolytic condensers which comprises the product of a mixture of ammoniated glycerine and a suitable quantity of weak acid anhydride thoroughly intermixed to secure the desired consistency of solution substantially without boiling.

18. An electrolytic solution for a metallic condenser foil which comprises a mixture of polyhydroxyl alcohol with ammonia producing an alkaline alcohol solution, and a suitable quantity of weak acid oxide, thoroughly intermixed to produce a sticky paste-like mass of comparatively thick consistency without boiling.

19. An electrolyte for electrolytic condensers consisting of the product of a mixture of polyhydroxyl alcohol, an alkaline material of the group consisting of alkali metal oxides and ammonia, a weak acid and a weak acid oxide in proportions to provide substantially without boiling an electrolyte of suitable characteristics for electrolytic condensers.

20. An electrolyte for electrolytic condensers consisting of the product of a mixture of polyhydroxyl alcohol, an alkaline material of the group consisting of alkali metal hydroxide and ammonia hydroxide, a weak acid and a weak acid oxide in proportions to provide substantially without boiling an electrolyte of suitable characteristics for electrolytic condensers.

21. An electrolyte for electrolytic condensers consisting of the product of a mixture of nitrogenated polyhydroxyl alcohol, a weak acid and a weak acid oxide in proportions to provide substantially without boiling an electrolyte of suitable characteristics for electrolytic condensers.

22. An electrolyte for electrolytic condensers consisting of the product of a mixture of polyhydroxyl alcohol, an alkaline material of the group consisting of alkali metal oxides and ammonia, a salt of weak acid and a weak acid oxide in proportions to provide substantially without boiling an electrolyte of suitable characteristics for electrolytic condensers.

23. An electrolyte for electrolytic condensers consisting of the product of a mixture of polyhydroxyl alcohol, an alkaline material of the group consisting of alkali metal hydroxides and ammonia hydroxide, a salt of weak acid and a weak acid oxide in proportions to provide substantially without boiling an electrolyte of suitable characteristics for electrolytic condensers.

24. An electrolyte for electrolytic condensers consisting of the product of a mixture of nitrogenated polyhydroxyl alcohol, a salt of weak acid and a weak acid oxide in proportions to provide substantially without boiling an electrolyte of suitable characteristics for electrolytic condensers.

25. An electrolyte solution for electrolytic condensers which comprises the product of a mixture of polyhydroxyl alcohol, an alkaline compound and a suitable quantity of weak acid anhydride thoroughly intermixed to produce an electrolyte having characteristics suitable for use in electrolytic condensers.

DONALD E. GRAY.